Jan. 11, 1966  B. W. McCLELLAN ETAL  3,228,743
FRAMING MECHANISM
Filed May 14, 1964
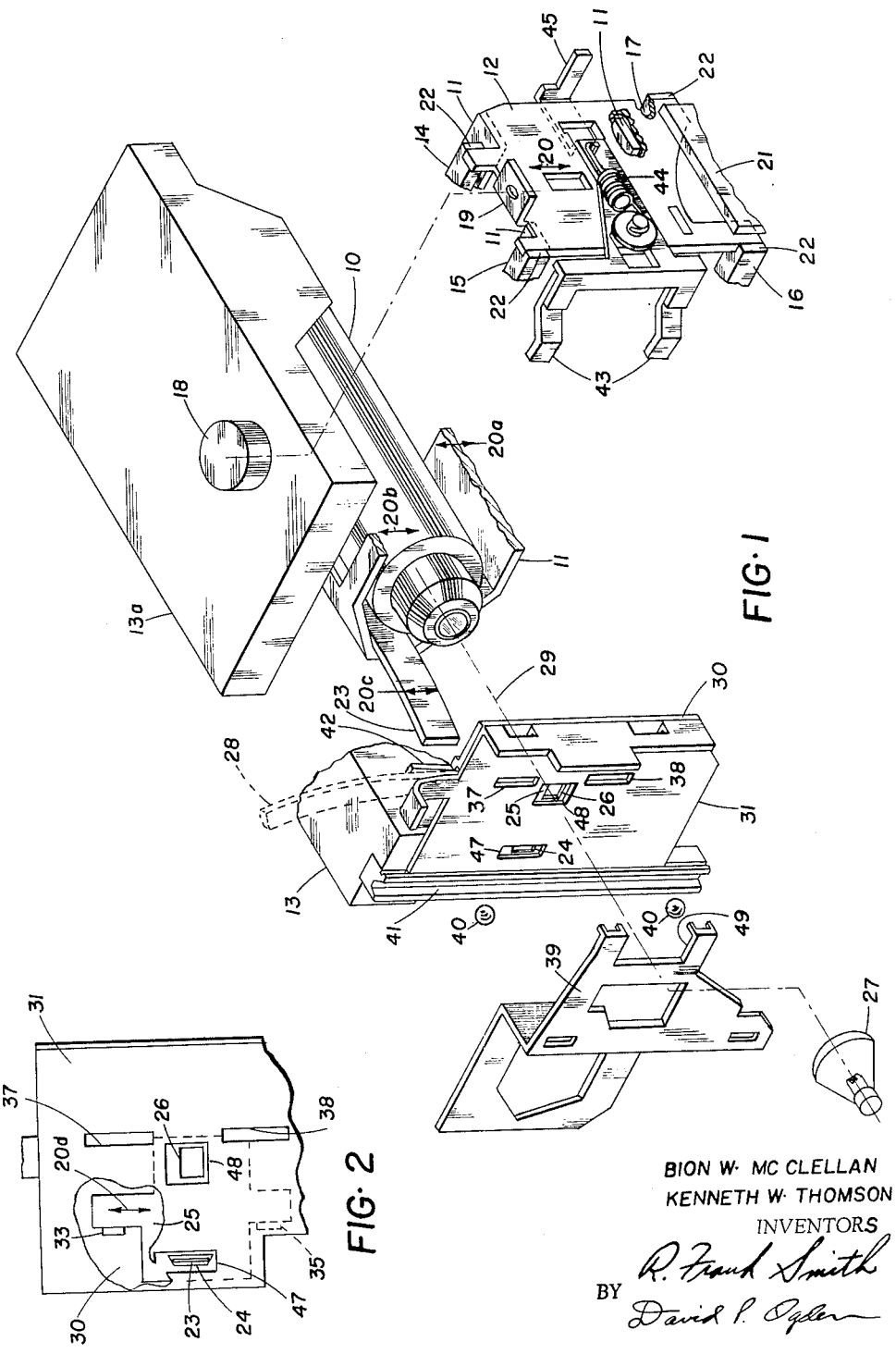
BION W. MCCLELLAN
KENNETH W. THOMSON
INVENTORS
BY R. Frank Smith
David P. Ogden
ATTORNEYS 3,228,743
FRAMING MECHANISM
Bion W. McClellan and Kenneth W. Thomson, both of Rochester, N.Y., assignors to Eastman Kodak Company, Rochester, N.Y., a corporation of New Jersey
Filed May 14, 1964, Ser. No. 367,460
8 Claims. (Cl. 352—231)

The present invention relates to a framing mechanism and more particularly to a framing mechanism usable in a motion picture projector wherein the projector lens system is moved during adjustment of the picture framing mechanism to prevent decentering of the image.

Prior art motion picture projectors utilize several arrangements for assuring the centering of a series of pictures in an aperture as the pictures are presented in sequence. The filmstrip is driven by a film indexing claw through a film gate positioned between a lamp and a lens system. Generally, it is impracticable to change the relative position of the claw tips compared to the framing aperture by motion of the claw tip drive mechanism. Also it is impractical to provide a reliable and simple arrangement for attempting vertical translation of a high speed shutter and its bearings. Because of the inherent complexities of the above, framing is often accomplished by vertically moving the framing aperture. However, substantial vertical movement of the framing aperture without corrective movement of a lens system tends to decenter the frame relative to the lens system to seriously degrade a screen image. Moreover, even a small vertical motion of an image aperture relative to the lens system is optically magnified at the image screen to move the image vertically a substantial amount and thereby develop annoying side effects such as requiring an excessively large screen, or readjustments of the position of a projector at any time it is necessary to change the framing of a picture sequence.

Therefore, an object of the present invention is to provide a simple and reliable framing mechanism wherein both the lens and the framing aperture are movable in unison.

In accordance with one embodiment of our invention, the lens system is mounted on a vertically slidable plate and has rigidly coupled thereto a framing link which tightly engages a slot of a plate defining the framing aperture. Because of the framing link, the framing aperture is vertically movable with the lens mount plate. Both the lens mount plate and the framing aperture plate are accurately guided so that their motion is limited to vertical motion whereby they both move substantially identical distances.

The subject matter which is regarded as our invention is particularly pointed out and distinctly claimed in the concluding portion of this specification. The invention, however, as to its organization and operation together with further objects and advantages thereof, will best be understood by reference to the following description taken in connection with the accompanying drawing in which:

FIG. 1 is a simplified exploded perspective view partially broken away to illustrate one embodiment of our invention; and FIG. 2 is a plan view partially broken away to illustrate in detail the framing plate support illustrated in FIG. 1.

Referring now to the drawing in which like numbers refer to similar parts, we have shown in FIG. 1 a lens system 10 secured in a cradle 11 which is in turn supported on a lens mount plate 12, secured to a main frame casting 13. The lens system 10 is secured in a fixed location in the cradle 11 by a spring means (not illustrated) so that there is no slack relative to vertical movement of the plate 12. More specifically, the plate 12 is vertically slidable over four guides 14, 15, 16 and 17 of the main frame member casting 13 in accordance with the rotation of a threaded adjustment knob 18 which is rotatably supported on a platform 13a secured to the frame 13 and which is drivingly coupled to a tab 19 of the plate 12. Thus, rotation of the knob 18 drives the support plate 12 vertically as indicated by the double-ended arrow 20 with a sliding motion over the guides 14–17.

The motion of the plate 12 is limited by stops (not shown) which limit the rotation of the knob 18. A nylon retainer bar 21 resiliently engages the lower portion of the plate 12 to prevent lateral displacement thereof. The guides 14–17 are each provided with a lateral projection 22 to cumulatively prevent longitudinal displacement or twisting of the plate 12. At the same time the plate 12 moves vertically, the cradle 11 which is rigidly secured thereto by staking, welding or the like moves vertically therewith as indicated by the double-ended arrow 20a.

Since the lens system 10 is secured in the cradle 11 it also moves therewith as indicated by the double-ended arrow 20b. Also secured to the cradle 11 is a framing link, or lever 23 which moves vertically in response to adjustment of the knob 18 as indicated by the double-ended arrow 20c. We prefer that the link 23 be of a tough material such as spring steel so that it will not be vertically deflected by the forces it transmits. The link 23 extends through a tapered drive slot 24 defined in a framing plate 25. The clearance tolerance of the link 23 in the drive slot 24 is minimized by deflection of the spring link 23 so that it presses continuously against slanted top and bottom of the slot 24 (to the left in FIG. 2).

The framing plate 25 defines a framing aperture 26 through which light from a lamp 27 is passed to an illuminate of a series of pictures presented sequentially by a motion picture filmstrip 28 (shown in phantom). The light is projected along a center line 29 of the lens system 10. The light path (29) is interrupted by a shutter (not shown) in a conventional manner during movement of the filmstrip 28.

As is shown more clearly in FIG. 2, the framing plate 25 itself is slidably secured within a sandwich composed of a plate 30 and a plate 31. The sandwich 30–31 includes a plurality of internal guide tabs 33 and 35 which engage the leftward vertical surfaces of framing aperture plate 25 because of the tension of the link 23 to prevent skewing. The plate 25 is moved vertically as indicated by the double-ended arrow 20d in response to vertical motion 20c of the framing link 23.

The plates of this sandwich 30–31 also define aligned apertures 37 and 38 through which a driving claw 39 engages the motion picture filmstrip 28 to advance it frame by frame through the film gate. Low frictional vertical movement of the claw 39 is enhanced by ball bearings 40 which roll in a track 41 and thus support the claw 39 during its operation. Although the operation of the claw 39 is reliably repetitive in that it will repeatedly place the filmstrip in a given position in respect to drive apertures thereof, it is not precisely predeterminable where the frame images of one filmstrip will come to rest compared to those of another filmstrip. Therefore, experience has taught that a framing adjustment is essential.

In addition to the sandwich 30–31, the film gate comprises a backup or support plate 42 provided to maintain the filmstrip 28 closely adjacent to the framing aperture 26. The support plate 42 is maintained closely adjacent to the sandwich 30–31 by a pressure pad 43 biased thereagainst by a spring 44. The pad 43 may be withdrawn from the support plate 42 by movement of a tab 45 to the right as indicated in FIG. 1.

In order that the plates of the sandwich 30-31 do not interfere with the motion of the framing link 23, they define aligned apertures 47 having a length sufficient to accommodate the full stroke thereof as limited by the stops co-operating with the knob 18. Similarly, there is provided an aperture 48 in the sandwich 30-31 to accommodate the scope of movement of the framing aperture 26. An equivalent aperture 49 is provided in the film-driving claw 39. However the aperture 49 is made larger to allow for the vertical motion thereof.

While we have shown and described particular embodiments of the present invention, other modifications may occur to those skilled in this art. We intend, therefore, to have the appended claims cover all modifications which fall within the true spirit and scope of our invention.

We claim:

1. In a motion picture projection apparatus, a framing mechanism, comprising:
   a main frame member;
   a lens mount plate vertically slidable on said frame member;
   a knob secured to said frame member and rotatable to drive said lens mount plate vertically;
   a lens system;
   a cradle for supporting said lens system, said cradle being secured to said lens mount plate for moving vertically therewith;
   a framing link secured to said cradle for moving vertically therewith; and
   a framing plate defining a framing aperture aligned with said lens system, said framing link arranged to drive said framing plate vertically with vertical movement of said lens mount plate to thereby correctly frame a series of motion pictures while maintaining alignment with said lens system by corresponding movement thereof.

2. A framing mechanism as in claim 1 wherein said framing plate is a thin, flat member supported between a pair of guide plates each having an aperture arranged to accommodate said framing link during its entire stroke and each having an aperture larger than the area of the framing aperture during adjustment so that only said framing plate defines the framing aperture function.

3. A framing mechanism as in claim 2 wherein said pair of guide plates form a sandwich with said thin member slidingly supported therebetween, said plate sandwich defining vertical guide surfaces to prevent skewing of said framing plate in response to driving thereof by said link.

4. In a motion picture projection apparatus, in combination with a lens system and an aligned light source, a framing mechanism, comprising:
   a vertically slidable lens mount arranged to securely support the lens system;
   a film gate;
   a framing plate aligned between the lens system and the light source and vertically slidable within guides of said film gate;
   a framing link coupling said lens mount to said plate to drive said plate vertically in accordance with vertical motion of the lens system as said lens mount is adjusted whereby a series of frames of a motion picture filmstrip will be centered in an aperture of said plate and the lens system will be moved a similar amount without decentering the image relative to the lens system; and
   means for driving said lens mount vertically to accomplish framing.

5. A projector apparatus as in claim 4 wherein said film gate includes a pair of plate members defining a sandwich with said framing plate slidably supported therebetween; and
   support means within said sandwich for preventing skewing of said framing plate during vertical motion thereof in response to motion of said framing link.

6. In a motion picture projection apparatus, a framing mechanism, comprising:
   a main frame member;
   a lens mount plate vertically slidable on said frame member;
   guide means on said frame member for preventing skewing of said lens mount plate during vertical motion thereof;
   a knob secured to said frame member and rotatable to drive said lens mount plate vertically;
   a lens system;
   a cradle for supporting said lens system, said cradle being secured to said lens mount plate for moving vertically therewith;
   a framing link secured to said cradle for moving vertically therewith;
   a film gate arrangement receptive of a filmstrip having discrete images thereon;
   a claw for driving the filmstrip through said film gate; and
   a framing plate vertically movable within a portion of said film gate and defining a framing aperture aligned with said lens system, said framing link arranged to drive said framing plate vertically with vertical movement of said lens mount plate to thereby correctly frame a series of pictures of the filmstrip while maintaining alignment with said lens system by corresponding movement thereof.

7. A framing mechanism as in claim 6 wherein said framing plate is a thin, flat member slideably supported between a pair of guide plates of said film gate, said framing plate defining a tapered aperture such that said framing link engages tapered top and bottom surfaces thereof, said framing link being biased to tightly engage said top and bottom surfaces to eliminate any vertical motion therebetween.

8. In a motion picture projection apparatus, in combination with a lens system and an aligned light source, on opposite sides of a film gate, a framing mechanism comprising:
   a vertically slidable lens mount arranged to securely support the lens system;
   means for driving said lens mount vertically;
   a framing plate within the film gate aligned between the lens system and the light source and vertically slidable within guides of the film gate, said plate defining a tapered drive slot;
   a framing link coupling said lens mount to the tapered drive slot and being biased to engage top and bottom tapered surfaces thereof to move said plate vertically in accordance with vertical motion of the lens system whereby a series of frames of a motion picture filmstrip may be centered in an aperture of said plate and the lens system will be moved a similar amount so that the image will not be decentered relative to the lens system.

References Cited by the Examiner

UNITED STATES PATENTS

| | | | |
|---|---|---|---|
| 2,255,038 | 9/1941 | Grimson | 352—221 |
| 2,312,663 | 4/1943 | Miller | 352—231 |
| 2,368,634 | 2/1945 | Boecking | 352—231 |
| 2,756,628 | 7/1956 | Lang | 352—231 |

JULIA E. COINER, *Primary Examiner.*